(12) United States Patent
Newman

(10) Patent No.: US 7,530,116 B2
(45) Date of Patent: May 5, 2009

(54) CONTROLLING THE DOWNLOADING AND RECORDING OF DIGITAL DATA

(75) Inventor: Peter Alfred Newman, Lower Earley (GB)

(73) Assignee: Macrovision Corporation, Santa Clara, CA (US)

( * ) Notice: Subject to any disclaimer, the term of this patent is extended or adjusted under 35 U.S.C. 154(b) by 721 days.

(21) Appl. No.: 10/164,653

(22) Filed: Jun. 6, 2002

(65) Prior Publication Data

US 2003/0229797 A1  Dec. 11, 2003

(51) Int. Cl.
G06F 7/04 (2006.01)
H04L 9/00 (2006.01)
G06F 17/30 (2006.01)
H04K 1/00 (2006.01)

(52) U.S. Cl. .............................. 726/31; 726/32; 726/26; 705/57; 705/59; 705/52

(58) Field of Classification Search .................. 726/31, 726/32, 26; 705/57, 59, 52
See application file for complete search history.

(56) References Cited

U.S. PATENT DOCUMENTS

| | | | |
|---|---|---|---|
| 5,629,980 A * | 5/1997 | Stefik et al. ................... 705/54 |
| 6,119,108 A | 9/2000 | Holmes et al. | |
| 6,353,890 B1 * | 3/2002 | Newman ..................... 713/193 |
| 6,389,541 B1 | 5/2002 | Patterson | |
| 6,611,813 B1 | 8/2003 | Bratton | |
| 6,665,797 B1 * | 12/2003 | Keung ......................... 713/193 |
| 6,684,199 B1 | 1/2004 | Stebbings | |
| 6,697,944 B1 | 2/2004 | Jones et al. | |
| 6,820,063 B1 | 11/2004 | England et al. | |
| 6,868,403 B1 | 3/2005 | Wiser et al. | |
| 7,103,574 B1 * | 9/2006 | Peinado et al. ................. 705/51 |
| 2001/0037304 A1 | 11/2001 | Paiz | |
| 2001/0053224 A1 * | 12/2001 | Kishi et al. .................. 380/232 |
| 2002/0138741 A1 | 9/2002 | Koch | |

(Continued)

FOREIGN PATENT DOCUMENTS

EP 0809244 11/1997

(Continued)

OTHER PUBLICATIONS

Menezes, Alfred J. et al. Handbook of Applied Cryptography, 1997 CRC Press, pp. 37-39, 559-561.*

(Continued)

Primary Examiner—Michael J Simitoski
(74) Attorney, Agent, or Firm—Orrick, Herrington & Sutcliffe LLP

(57) ABSTRACT

A method and apparatus for enabling a licensed end user to record digital data as described is particularly useful to the music industry as it enables them to make audio data available over the internet but to retain control of the uses to which that audio data can be put. Thus, upon completing a financial transaction to pay for the required audio tracks, the end user is enabled to download and decrypt encrypted music tracks and to play them on the end user's personal computer. The end user can also be allowed to burn a CD including the downloaded music tracks. However, the end user is only enabled to decrypt and record the music tracks onto the CD if the music tracks are recorded together with copy protection.

14 Claims, 4 Drawing Sheets

U.S. PATENT DOCUMENTS

2002/0196941 A1  12/2002  Isaacson et al.
2003/0005246 A1* 1/2003  Peinado ...................... 711/163
2003/0028786 A1  2/2003  Mustafa

FOREIGN PATENT DOCUMENTS

| | | |
|---|---|---|
| EP | 0874299 | 10/1998 |
| EP | 0874300 | 10/1998 |
| EP | 0878796 | 11/1998 |
| EP | 1035543 | 9/2000 |
| GB | 2366969 | 9/2000 |
| WO | WO00/74053 | 12/2000 |
| WO | WO 01/44907 A1 | 6/2001 |
| WO | WO 01/44908 A1 | 6/2001 |
| WO | WO01/61695 | 8/2001 |
| WO | WO/0161696 | 8/2001 |
| WO | WO 02/01329 A2 | 1/2002 |
| WO | WO 02/075735 A1 | 9/2002 |

OTHER PUBLICATIONS

S.C. Cheung and Hanif Curreem, Rights Protection for Digital Contents Redistribution Over the Internet, in the *Proceedings of 26th International Computer Software and Applications Conference (COMPSAC 2002)*, IEEE Computer Press, Oxford, United Kingdom, Aug. 2002, pp. 105-110.

Marcus Peinado, Fabien A. P. Petitcolas and Darko Kirovski. Digital rights management for digital cinema. *Multimedia Systems Journal*, vol. 9, No. 3, pp. 228-238, 2003.

Willms Buhse, Categorizing Distribution Model Scenarios for Online Music, Electronic Commerce and Web Technologies, Munich, Germany, Sep. 4-6, 2001, 12 pp.

Thomas Pack, Digital Rights : Can the Technology Provide Long-Term Solutions ?, www.econtentmag.com, May 2001, 6 pp.

Frank Hartung and Friedhelm Ramme, Digital Rights Managemtn and Watermarking of Multimedia contaent for M-Commerce Applications, IEEE Communications Magazine, Nov. 2000, pp. 78-84.

Thea George, A Touch of Magex, Banking Technology, Jul./Aug. 1999, p. 54.

* cited by examiner

CONTROLLING THE DOWNLOADING AND RECORDING OF DIGITAL DATA

The present invention relates to a method and apparatus for enabling a licensed end user to obtain and/or record digital data, but with the use of that digital data being controlled. The invention also extends to copy protected data carriers and to application files for enabling their protection.

Techniques exist which enable a consumer to download digital data, such as audio data, over the internet after they have paid for the data files concerned. The music industry, for example, would like to make its music available to consumers in this manner, and appreciates that the consumer may well wish to do more than store the downloaded music in a personal computer. If the consumer can record the downloaded music onto a recordable compact disc (CD-R), he will then have a digital audio compact disc (CD-DA) carrying a compilation of downloaded tracks for use, for example, in home hi-fi apparatus, in an audio player provided in a car, and/or in a portable audio player. The technology to enable a consumer to make such a CD, namely a CD recorder or burner, is now commercially available.

Of course, there is a real danger that consumers will use the available technology not just to make individual CDs for personal use, but to make a number of copy CDs for distribution.

The present invention arises out of the need to address these problems and proposes a method and apparatus for enabling a licensed end user to record downloaded digital data in which method the number of data carriers, such as optical discs, which the licensed end user can make is controlled, and in which the recorded data carriers are protected against copying.

According to a first aspect of the present invention there is provided a method of enabling a licensed end user to record digital data, the method comprising the steps of providing, at the request of a licensed end user, digital data in encrypted form, and enabling the licensed end user to record the decrypted digital data onto a data carrier, the method further comprising the step of requiring that the decrypted digital data can only be recorded onto the data carrier together with means which provide copy protection for the decrypted digital data.

With embodiments of a method of the invention, the licence obtained by the end user determines the manner in which the decrypted audio data can be recorded. First of all, the method requires that any recordings which are made are provided with copy protection of the recorded digital data. Additionally and/or alternatively, the licence controls the number of times that the downloaded digital data can be recorded onto an individual data carrier.

Preferably, the method comprises the further step of enabling the licensed end user to decrypt and play the digital data provided. This enables the end user, for example, to play the music and other digital data downloaded using the computer by which the download was performed.

In a preferred embodiment of a method of the invention, the method comprises the step of licensing the end user upon the completion of a financial transaction between the end user and a supplier of digital data to decrypt and play the digital data provided.

The licensing arrangements can be arranged such that the end user is enabled both to play downloaded digital data and to make a predetermined number of recordings thereof. Alternatively, it would be possible to enable either for the playing of the downloaded digital data by the end user or to enable recording onto a data carrier, for example, by a burner or other recorder associated with the end user.

In a preferred embodiment, the method comprises the step of licensing the end user upon the completion of a financial transaction between the end user and a supplier of digital data to record the decrypted data, in copy protected form, onto a number of data carriers.

For example, the end user may only be enabled to record the decrypted data, in copy protected form, onto a single data carrier.

At present, recordable CDs (CD-R and CD-RW), and apparatus for recording such CDs, often known as burners, are commonly and commercially available. In addition, copy protection techniques, which have been proposed for copy protecting audio data on CDs, have been found to be suitable for application to a CD during its burning by available CD recorders. Thus, methods of the present invention can be immediately implemented to control the downloading and recording of audio data onto CDs.

However, it will be appreciated that the invention is not restricted to use with audio data and that the invention can similarly be used to control the downloading of, and recording of images, video, and other data. It is expected, for example, that DVD recorders for home use will become widely available in the near future. Accordingly, this invention is not restricted to the control of audio data and to the control of the recording of audio data on CDs, although techniques for these applications are exemplified herein.

In the description and claims of this specification we distinguish between the "playing" of digital data obtained and the "extracting" of that data. Thus, the term "playing" refers to rendering the digital data into analog form. A player or drive arranged or controlled to play the digital data, therefore, is referred to as a "player". Such players will include, therefore, commercially available CD music players which function solely to play the music or other audio on a CD and video players which similarly play the video recorded on a DVD. It is clearly required that any copy protection added onto the data carrier does not generally impinge on, or effect the normal operation of a player of the digital data.

The copy protection to be added to a data carrier is to prevent "ripping", that is, to prevent acts of extracting and storing digital data so that the data can be copied. In this respect, "ripping" may be undertaken on drives in computers, and on other devices, such as some players, which can be controlled to extract and store the digital data. In the description and claims of this specification, the term "data reader" is used to refer to all players and drives which can be arranged or controlled to extract the data on a data carrier and thus used for "ripping". Thus data readers will include, for example, CD-ROM drives when configured or controlled to extract or rip data from the CD-ROM. In the practice of this invention it may be required to enable a CD-ROM drive, for example, to play downloaded digital data such as audio or video, but to prevent that same CD-ROM drive from being used to make a copy of the digital data on the optical disc unless the end user is licensed.

In preferred embodiments of the invention, the means recorded onto the data carrier to provide copy protection for the decrypted digital data comprises a digital signature and a verification routine requiring access to the digital signature.

In this respect, techniques utilising a digital signature to provide copy protection are well known. One example is described, for example, in U.S. Pat. No. 6,353,890 in which access control information is carried on the data carrier. If the presence of the access control information is detected, data carried on the data carrier can be decrypted by use of a key incorporated within the access control information, or digital signature.

Additionally and/or alternatively, to record means onto the data carrier to provide copy protection for the decrypted digital data, the method comprises encoding incorrect and/or inaccurate control data onto the data carrier, the control data which is incorrect and/or inaccurate being usuable by a reader of the digital data.

For example, the incorrect control data encoded onto the data carrier is either inaccessible to, not generally read, or is generally ignored during playing of the digital data.

Techniques involving the encoding of incorrect and/or inaccurate control data onto a CD for protecting digital audio data, for example, are described in WO 00/74053, WO 01/61695, and WO 01/61696.

In these prior specifications, incorrect data may, for example, falsely identify the position on the disc of the Lead Out, may effectively hide the fact that the disc contains multiple sessions, and/or may identify audio incorrectly as data. The data in the Table of Contents (TOC) may be rendered incorrect. Additionally and/or alternatively, navigation and/or timing data may be rendered incorrect and/or control data representative of the structure of the data on the disc may be rendered incorrectly.

Preferably, the digital data to be recorded onto the data carrier has been downloaded by way of the internet.

As earlier set out, the present invention is applicable to all types of digital data, and, for example, the digital data may be audio data, video, images and/or application files. The data carrier maybe a magnetic disc or an optical disc, and the optical disc may be a CD or a DVD, for example.

A method for an embodiment of the invention, enabling a licensed end user to obtain and record digital data may further comprise providing digital data required by the end user after its encryption utilising a key generated by and stored by the end user, completing a financial transaction between the end user and the supplier of the digital data to licence the end user to obtain the digital data, and indicating the completion of the financial transaction whereby the end user is enabled to obtain and decrypt the encrypted digital data utilising the key stored by the end user.

In an embodiment of a method enabling a licensed end user to obtain and record digital data, the method further comprises storing the encrypted digital data at the end user with information identifying the licensed rights obtained by the financial transaction, and, where the licensed rights include a right to record the digital data, generating a request to obtain a further key enabling recording of the decrypted digital data.

In a preferred embodiment, the further key is caused to expire once the licensed recording of the digital data has been undertaken.

This expiry of the further key causes the licensed facility to record the digital data to be withdrawn.

The present invention also extends to apparatus for enabling a licensed end user to record digital data, said apparatus comprising processing means arranged to receive digital data in encrypted form and to decrypt the received digital data, and recording means for recording the decrypted digital data onto a data carrier, the apparatus further comprising means constraining the recording means to record the decrypted digital data onto a data carrier together with means protecting the digital data against copying.

In an embodiment, the apparatus further comprises a player for playing the decrypted digital data.

In one arrangement, the processing means is incorporated into an end user apparatus, and said end user apparatus also incorporates a media player able to play the decrypted digital data.

In an embodiment, the apparatus may comprise an end user, for example, in the form of a personal computer, incorporating said processing means and said recording means.

In an alternative embodiment, the recording means is provided in a recording apparatus which also comprises decryption means for decrypting the digital data, the recording apparatus further comprising communication means arranged to receive external information enabled to control said decryption means.

The recording apparatus may further comprise copy protection means for encoding and recording copy protection information onto a data carrier.

It will be appreciated that the individual elements which make up apparatus of the invention may be configured in software, or in hardware, or in some combination thereof. Furthermore, the individual elements may be provided by elements of a computer, by elements of a recording apparatus, and/or by elements of each. Additionally and/or alternatively, a separate dedicated recording and copy protecting apparatus, including some or all of the elements, may be provided.

In one implementation, the end user will be formed by a personal computer arranged to communicate with the internet. The processing means of the computer may be used to undertake the decryption of the digital data received and/or to control the recording apparatus. If required, the recording apparatus may additionally be provided with processing means, for example.

The present invention also extends to a data carrier carrying copy protected digital data which has been recorded thereon by a method and/or apparatus as defined above.

According to a further aspect of the present invention there is provided an executable application file arranged to cause operation of an apparatus to record digital data as defined.

The invention also extends to an executable application file arranged to cause an end user device to record digital data onto a data carrier, the application file comprising:

an instruction to retain a key which has been used to encrypt digital data, an instruction to obtain a further key to enable recording of the digital data, an instruction to decrypt the digital data using the retained encryption key, and an instruction responsive to the receipt of the further key to cause recording of the decrypted digital data with the addition of copy protection for the digital data.

Preferably, the executable application file further comprises an instruction to access a catalogue for a database containing digital data files, and an instruction to generate a key for each digital data file selected.

In an embodiment, the instruction to generate a key is dependent upon the completion of a financial transaction between the end user and a controller of the database of digital data.

According to a further aspect of the invention, there is provided a method of enabling a licensed end user to record digital data, the method comprising the steps of:

licensing the end user upon completion of a financial transaction between the end user and a supplier of digital data to have agreed rights over selected digital data, enabling the licensed end user to obtain the selected digital data and to use the selected digital data in accordance with the licensed rights, and enabling recording by the end user of the selected digital data onto a data carrier, wherein the selected digital data is made available in encrypted form and the end user is enabled to decrypt the selected digital data for licensed use and licensed recording.

Preferably, the method further comprises enabling the licensed end user to download the selected digital data over the internet.

In an embodiment, the method further comprises providing the selected digital data after its encryption by a key generated by and stored by the end user, the end user being enabled to decrypt the encrypted digital data using the key stored by the end user.

Preferably, the selected digital data is stored at the end user with information identifying the licensed rights obtained by the financial transaction, and, where the licensed rights include a right to record the selected digital data, the method further comprises generating a request to obtain a further key enabling recording of the selected digital data.

In a preferred embodiment, the method further comprises the step of requiring that the selected digital data can only be recorded onto the data carrier together with means which provide copy protection for the selected digital data.

The present invention also extends to apparatus for enabling a licensed end user to record selected digital data, said apparatus comprising processing means arranged to communicate with a financial server whereby a financial transaction can be completed to obtain for the end user rights over selected digital data, the processing means being arranged upon completion of the financial transaction to obtain the selected digital data and to use the selected digital data in accordance with the licensed rights, and the apparatus further comprising recording means for recording the selected digital data onto a data carrier, wherein the selected digital data is made available in encrypted form and the processing means is enabled to decrypt the selected digital data for licensed use and for licensed recording.

Preferably, the processing means is enabled to download the selected digital data over the internet.

According to a further aspect of the present invention there is provided an executable application file arranged to enable an end user device to record digital data onto a data carrier, the application file comprising:

an instruction to complete a financial transaction with an end user for the end user to buy selected digital data, an instruction to provide the selected and bought digital data to the end user, and an instruction to enable the end user to decrypt and record the selected digital data.

Embodiments of the present invention will hereinafter be described, by way of example, with reference to the accompanying drawings, in which.

Figure 1:
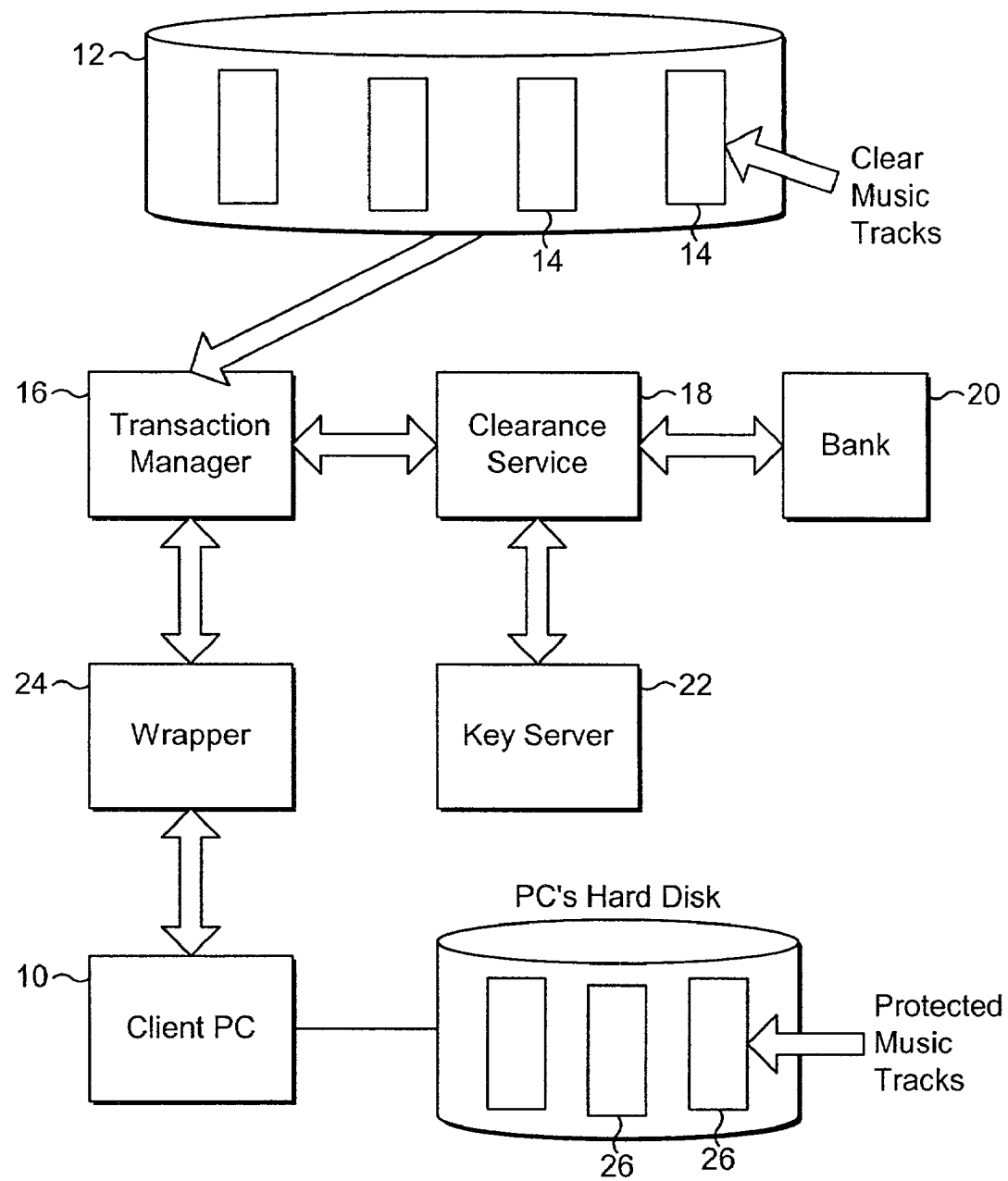
FIG. 1 illustrates the downloading of audio data to an end user computer.

The present invention will be described herein specifically as enabling a licensed end user to obtain digital audio data and to record that audio data onto a CD in a manner which renders the CD copy protected. However, the method described herein is applicable to the downloading and recording of digital data in general and that recording may be onto any appropriate data carrier.

For example, an end user may be licensed to download video, images, audio data, application data, other digital data, and/or any required combination of such digital data and to record that data onto any format CD, onto any format DVD, or to any other format of optical disc. The invention may also be used to control the downloading of digital data onto other data carriers such as mini discs, and floppy discs. The invention is described in the following with reference to the downloading of audio data simply by way of example and the invention is not limited to the nature of the digital data nor to the nature or the format of the data carrier onto which the digital data is recorded.

Similarly, in the exemplary embodiments, reference is made to a CD burner. However, it will be appreciated that the invention is applicable to any recorder capable of recording CDs, and similarly to any recorder capable of recording onto a data carrier. It will be appreciated that the invention encompasses recording using DVD recorders. It is expected that DVD recorders will become more generally available in the short term.

The invention described herein arose to meet a specific need of the music industry which wanted to make audio data available over the internet but equally wished to retain control of the uses to which that audio data was put. There is a clear danger in enabling access to music by way of the internet as an end user will generally have a personal computer which can not only act to play the downloaded audio data, but can also act as a reader to extract the data from the downloaded audio thereby enabling ripping. In this respect, the end user computer can also control a recorder for a CD, generally a CD burner, and thus an end user is likely to be in possession of all of the equipment necessary not only to download music for personal use, but also to make multiple copies of that music for dissemination.

The music industry requires to make music available by way of the internet, but subject to the completion of a financial transaction by which an end user pays for the music. In addition, whilst there is generally no problem in allowing an end user who has paid for the music to record it onto a CD for personal use, for example, in a portable audio player, in an in-car audio player, or in hi-fi apparatus, it is required to prevent an end user recording the music downloaded onto several CDs. It is also required to copy protect the audio data on a CD recorded by an end user. The present invention provides means enabling control of the supply of the audio, and indeed other digital data, to an end user and ensures that any CD, or other data carrier, recorded by an end user is copy protected. By this means a supplier of digital music or other digital data retains control of the uses to which the downloaded data can be put.

FIG. 1 shows schematically a scheme of the invention for enabling audio to be downloaded by an end user in a manner controlled by a supplier, who may be, for example, a publisher of music and other audio data. In this respect, an end user device such as an end user computer 10 is to access, by way of the internet, the catalogue of a music server which is indicated at 12. The music server 12, provided by a music publisher, will have a plurality of music tracks, as 14, available for sale. These music tracks 14 are stored on the music server 12 without encryption or any copy protection, although free access to the music tracks 14 is prevented, for example, by a firewall.

In known manner, the end user computer 10 is used to log onto the music server 12 and is enabled to browse its catalogue. The end user computer 10 can make a selection from the catalogue of music tracks 14 available on the music server 12. The end user may have an account with the organisation controlling the music server 12 or may pay for the music by credit card. Having chosen the music tracks 14 required, therefore, the end user computer 10 communicates by way of a transaction manager 16 and a clearance service 18 with a bank server, indicated at 20, whereby a cleared payment for the music tracks 14 to be downloaded is authorised. The satisfactory completion of the financial transaction causes the clearance server 18 to generate one or more response codes. The provision of the response codes enables downloading of the selected, and paid for, music tracks 14.

In response to the generation of a response code, the end user computer 10 is caused to generate a key which is locked to the end user computer 10 and is individual to it. This key is generated by reference to a key server 22 which is interrogated by the end user computer 10 in response to the provision of the response code. In the preferred scheme, for additional security, each music track 14 has an individual response code, and hence an individual and distinct key. Each key is recorded in a database held in the transaction manager 16 together with details of the music track 14 to which it corresponds. The transaction manager 16 keeps a record of each key generated, of the corresponding music track 14 selected, and of the rights to that track which have been purchased.

The manner in which the key is generated is a matter for choice. Generally it is preferred that the key is a composite which incorporates a fingerprint of the end user computer 10 so that each key is individual to a particular user computer. Preferably, the key server 22 hosts the keys with the key on the end user computer 10 acting as a carrier.

The information from the transaction manager 16 is then used by a wrapper 24 to encrypt each music track 14 purchased. The key is used in the encryption. The end user computer 10 may then download each purchased music track in an encrypted form.

It will be appreciated that as the end user computer 10 has the appropriate key locked into it, it can be enabled to decrypt each encrypted music track 26 and play that music track. In this respect, the process shown in FIG. 1 may be, for example, the digital rights management and transaction process which is currently available from Macrovision Europe Limited under the name "SafeCast".

As explained above, it is not only required to enable an end user to download music tracks to play upon making the appropriate payment, but also to enable the end user to compile an album of such music tracks and burn them onto a CD. However, to ensure that control of the downloaded music tracks is retained, it is required that the resultant CD produced by the end user is copy protected.

Figure 2:
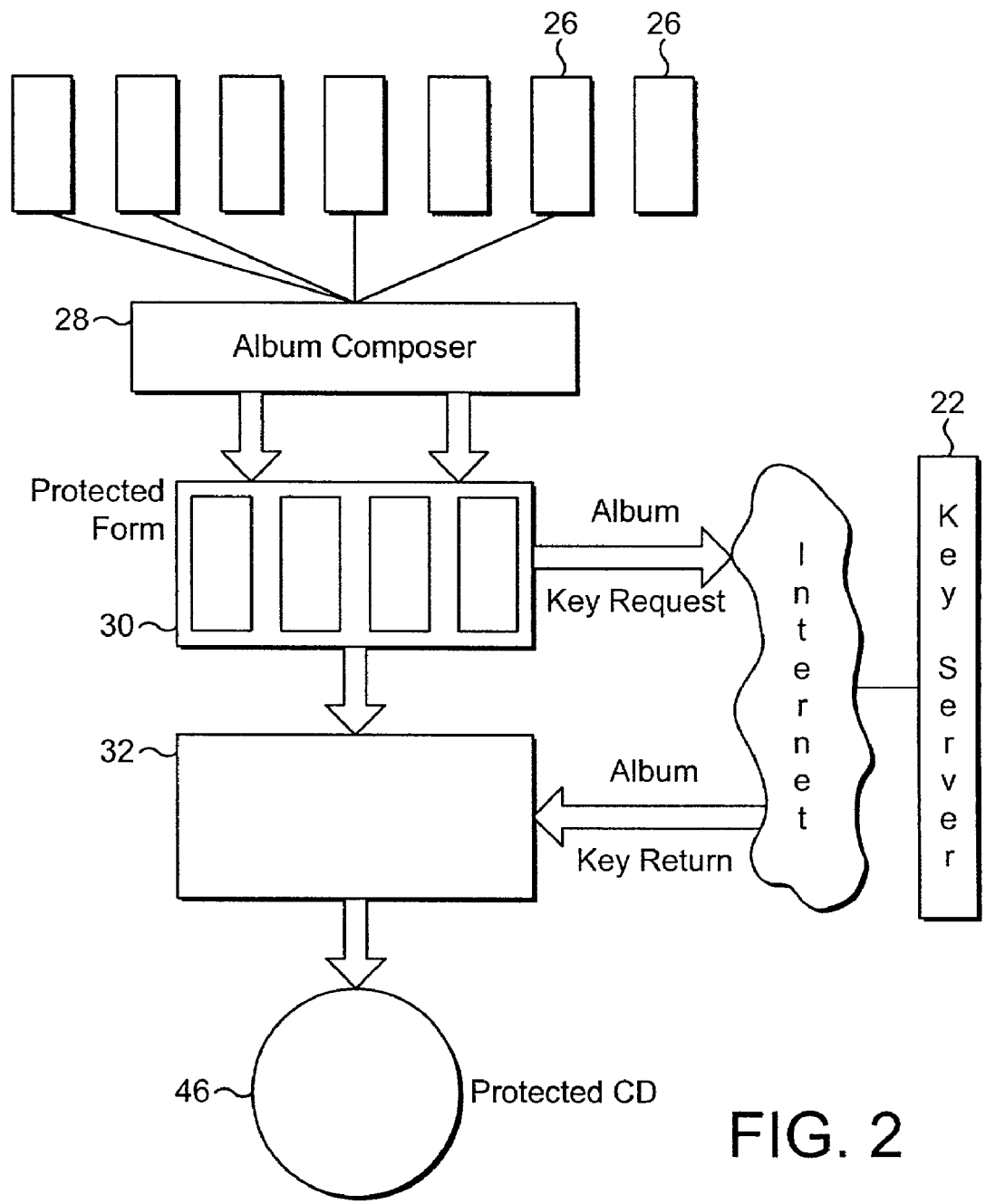
FIG. 2 illustrates the recording of an album at an end user computer.

The burning onto a CD of an album compiled from a number of encrypted and downloaded music tracks 26 provided by the rights management and transaction process shown in FIG. 1 is illustrated in FIG. 2. As indicated in FIG. 2, the end user chooses and downloads a number of encrypted music tracks 26 which are stored in the end user computer 10. These music tracks are arranged by an album composer 28 provided at the computer 10. This composer 28 might be configured, for example, by software caused to be downloaded to the end user computer. Thus, an album 30 made up of a number of encrypted music tracks is formed. It will be recalled that each of the music tracks needs a key locked into the computer 10 for its decryption. In this respect, the album 30 also stores with each music track information as to the rights which have been purchased and as to the key which is required for its decryption. This is the information assembled in the transaction manager 16 of FIG. 1.

Where permission has been bought to burn a track, the album 30 is arranged to generate a request for a further key to the key server 22 by way of the internet. By this further transaction, a "once only" key may be returned to a recording apparatus 32, controlled by the end user computer 10. This recording apparatus, which incorporates a burning engine and a burner (not shown) is then enabled to burn the decrypted track onto a CD 46. However, the recording apparatus 32 is also required and caused to copy protect the decrypted music tracks during the burning process. In this respect, most current CD burners can be instructed to modify the control data written to a CD and/or to write a digital signature with an appropriate authentication routine to the CD whereby copy protection techniques can be applied to the CD as it is being burnt.

The further key which is provided to enable the recording apparatus 32, to burn the decrypted music track onto the CD 46 is generally arranged to expire after a single use. This is the applicants' known "SafeCast" technique which can be used to ensure that only a single copy of a downloaded music track is made. Of course, the end user may be allowed to buy rights to make more than one copy and appropriate further single use keys may be generated. Alternatively, multiple use keys may be provided.

The arrangements shown in FIG. 2 are generally provided by software which is made available to the end user computer 10. The software, for example, may be downloaded by the end user computer 10 when a first music track 14 is ordered by the process shown in FIG. 1. Additionally and/or alternatively, an executable application may be made available to an end user computer 10 either by way of a disc or as a downloadable file from another source. In one preferred embodiment downloadable players for music, such as Microsoft's "Media Player" may be modified to incorporate the necessary executable application, as indicated in FIG. 2, for downloading and burning CDs utilizing methods of the invention.

Figure 3:
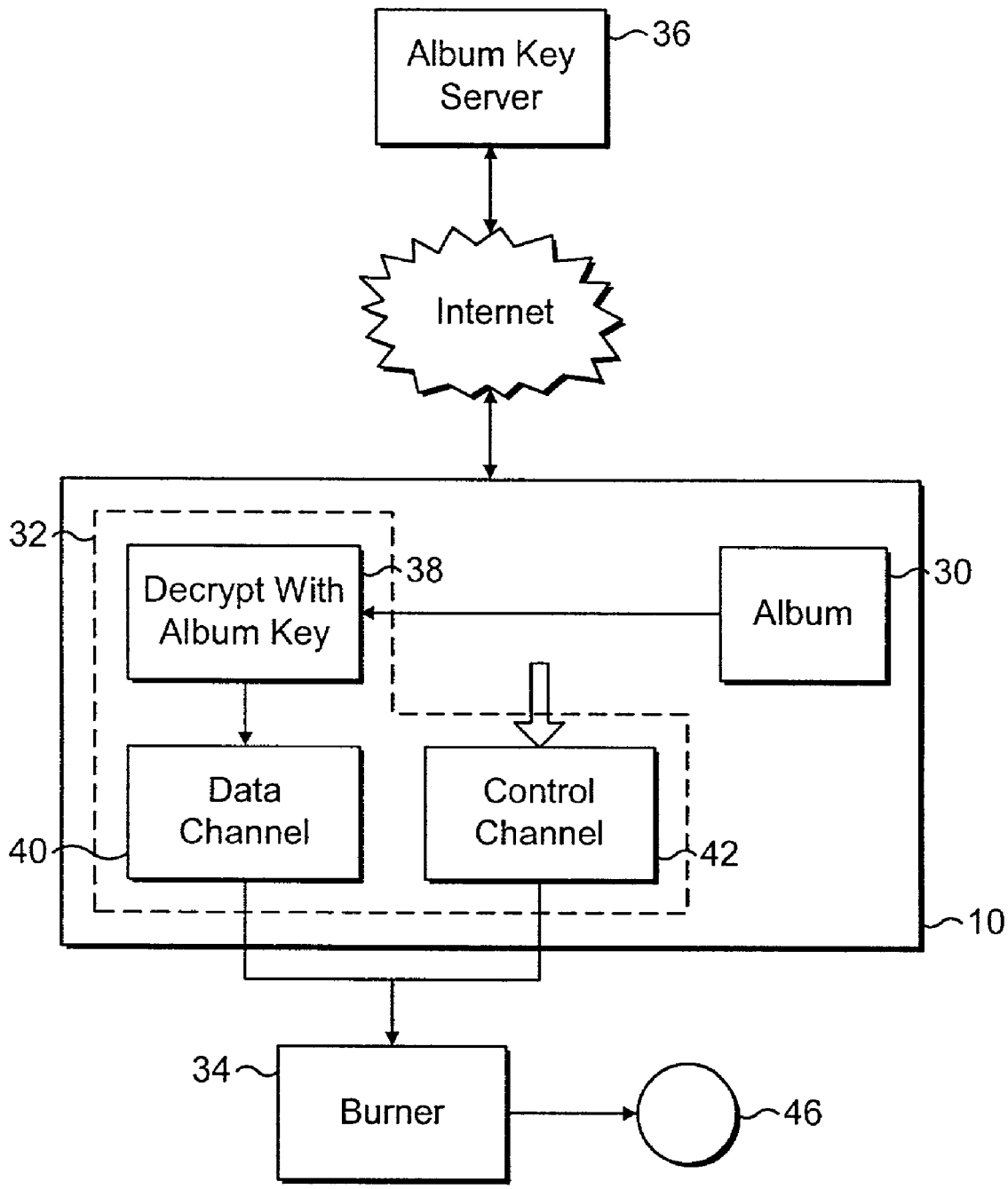
FIG. 3 shows schematically an embodiment of recording apparatus for recording audio data onto a CD utilising current CD burners.

FIG. 3 illustrates how the apparatus necessary to record copy protected and decrypted music tracks onto a CD 46 might be configured using existing technology. Thus, FIG. 3 shows a computer 10 in communication with an album key server 36 by way of the Internet. This computer 10 controls a CD burner 34 to record a CD 46. Within the computer 10, software providing a burning engine 32 is provided. This burning engine 32 includes a decryptor 38.

In the computer 10 there is an album, as 30, which has been compiled as described above to include the downloaded album tracks in their encrypted form. The computer 10 is in communication with an album key server 36 which includes information as to the key required to decrypt the individual tracks and details of the rights which have been purchased for each track. Thus, the album key server 36 has information as to whether the right to burn the tracks has been purchased and also as to the number of times that each track can be recorded. The album key server 36 may be part of, or communicate with, the key server 22 to receive or generate the further key to enable recording of the album. The album key server 36 then enables the decryptor 38 within the burning engine 32 to obtain and decrypt each of the tracks with the appropriate key and then to encode that audio track onto a CD 46 by way of the burner 34. In this respect, and as shown, the audio data, or main channel data is routed to the burner 34 by way of an audio data, or main channel 40 whereas appropriate copy protection is shown being added to the CD 46 by way of a control channel 42.

Of course, it will be appreciated that the various elements making up the apparatus maybe configured in hardware, or in software or in some combination of both according to requirements. Furthermore, whilst in the embodiment shown in FIG. 3, the computer 10 is shown as providing the necessary processing means for the software and storage of data, new generations of CD burners may be configured to enable them to undertake processing and storage functions.

In this respect, when using apparatus as shown in FIG. 3, unprotected, unencrypted, clear audio data can be found within the end user computer 10 as it is such audio data which has been decrypted from the downloaded music tracks and which is then to be encoded onto the CD 46 together with the copy protection. There is the risk, therefore, that it may be possible to locate and tap into that audio data whereby multiple unprotected copies thereof could be made. To guard against this it is proposed that the next generation of CD burners should, as illustrated in FIG. 4, have incorporated therein the processing capability and software to receive encrypted data.

Figure 4:
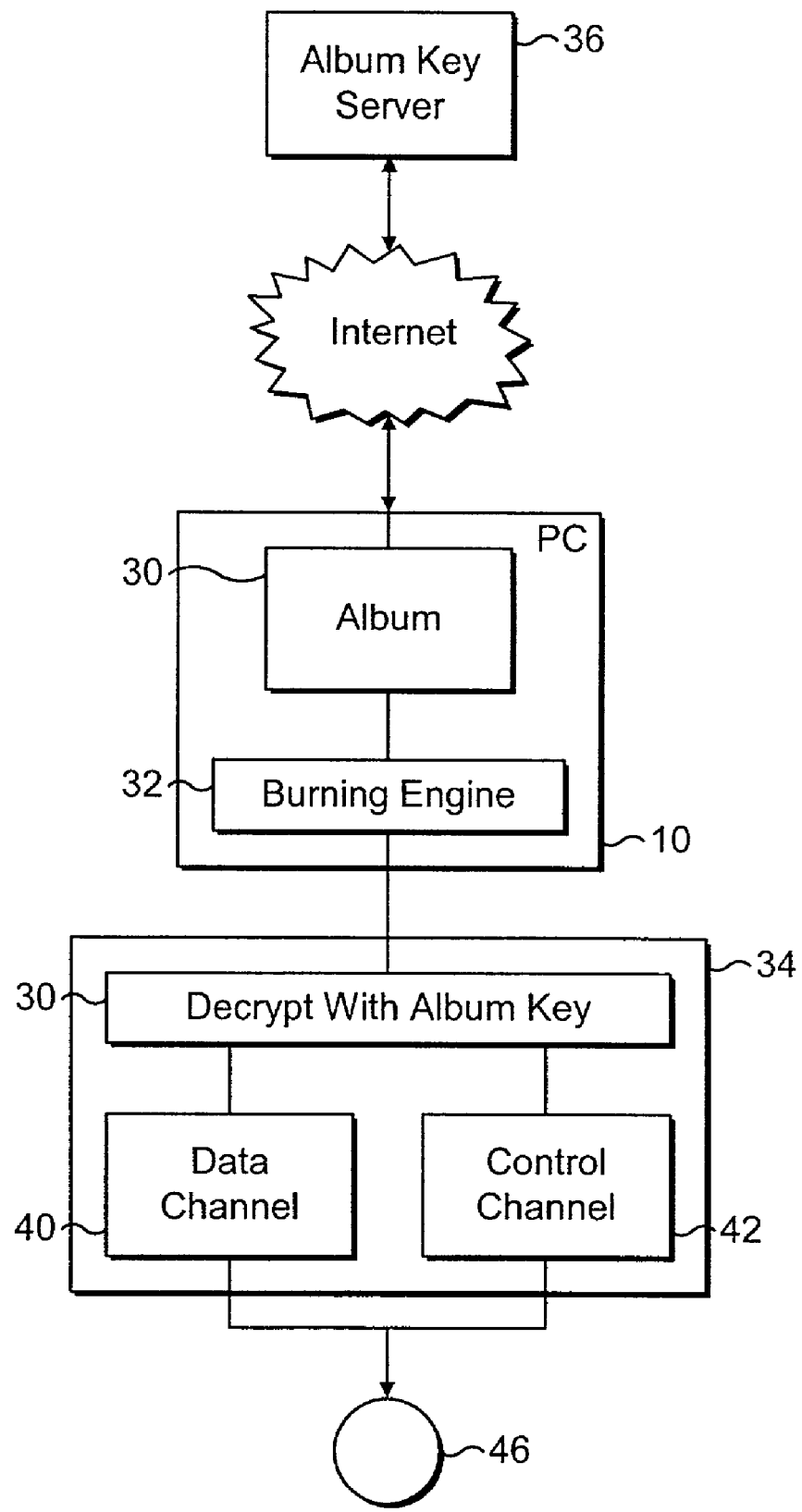
FIG. 4 shows schematically an embodiment of recording apparatus for recording audio data onto a CD indicating the configuration of a specialised CD burner.

FIG. 4 shows the same software and hardware elements as FIG. 3 but the distribution of those elements across a computer 10 and a burning engine 32 and a burner 34 has been reconfigured. Thus the software for controlling the burner 34, which is generally known as the burning engine 32, remains within the computer 10, but a new generation of burner 34 is provided with the capability to decrypt the music to burn onto the CD 46. It will be appreciated that the operation of the apparatus shown in FIG. 4 is substantially identical to that of FIG. 3.

It will be appreciated that the method of copy protecting the burnt CD can be chosen as required. For example, a digital signature which requires that the CD be retained within a drive whilst being played, as described in U.S. Pat. No. 6,353,890 may be provided.

Additionally and/or alternatively, incorrect and/or inaccurate control data as described, for example, in WO 00/740453, may be encoded onto the CD. The control data which is rendered incorrect may, for example, incorrectly identify the position on the disc of the Lead Out in the Lead In of the disc. For example, the data in the Lead In may show the Atime at the start of the Lead Out to be zero. Alternatively the data in the Lead In may have a value for the Atime at the start of the Lead Out which occurs during a first audio track on the CD. Additionally and/or alternatively, the data on the CD identifying the nature of the tracks may incorrectly identify each audio track as a data track.

In a preferred embodiment, data in the Table of Contents (TOC) of the CD may be rendered inaccurate. In this embodiment, if the disc is arranged to have multiple sessions, the existence of most of these sessions can be hidden from a data reader.

The methods described, for example, in WO 00/74053 prevent a data reader from extracting the data on the disc. In addition, a data reader such as a CD-ROM drive is unable simply to play the audio which has been burnt onto the disc. However, in the context of this invention, where the downloaded files can be played by the end user computer 10, the provision of copy protection on the burnt CD which makes it possible to play that CD only on audio players is quite acceptable.

However, it may also be possible to control new generations of burners to employ copy protection techniques as described, for example, in WO 01/61695 and WO 01/61696. These later techniques do not generally prevent use of a data reader to play a copy protected disc but do either prevent copying by a data reader or degrade any copies which can be made.

It will be appreciated that any other methods for copy protecting compact discs, other optical discs, and other data carriers, may be utilised if required.

It will be appreciated that the schemes illustrated in each of FIGS. 1 to 4 require appropriate software routines for their implementation. The provision of the appropriate software routines is within the competence of those skilled in the art and further details thereof are not required.

It will be appreciated that modifications and variations may be made to the embodiments as described and illustrated within the scope of the accompanying claims.

The invention claimed is:

1. A method of enabling an end user to record digital data, the method comprising:
   generating, by the end user, an encryption key;
   providing, to the end user, at the request of the end user, encrypted digital data, the encrypted digital data having been encrypted by the encryption key;
   storing the encrypted digital data with information identifying licensed rights;
   allowing the end user to decrypt and record the digital data with copy protection onto a data carrier where the licensed rights include a right to record the digital data;
   generating a request to obtain a key to enable recording of a decrypted digital data; and
   upon use of the key by the end user to record the decrypted digital data onto the data carrier requiring that the decrypted digital data be recorded together with the copy protection for the decrypted digital data to render a copy controlled disc, the copy protection including a digital signature and an authentication routine.

2. The method of claim 1, further comprising enabling the end user to decrypt and play the digital data.

3. The method of claim 2, further comprising licensing the end user, upon completion of a financial transaction between the end user and a supplier of the digital data, to decrypt and play the digital data provided.

4. The method of claim 1, further comprising licensing the end user upon completion of a financial transaction between the end user and a supplier of the digital data, to record the decrypted data, in a copy protected form, onto a number of data carriers.

5. The method of claim 4, wherein the licensed end user is only enabled to record the decrypted data, in copy protected form, onto a single data carrier.

6. The method of claim 1, wherein the copy protection for the decrypted digital data comprises a digital signature and a verification routine requiring access to the digital signature.

7. The method of claim 1, further comprising encoding inaccurate control data onto the data carrier, the control data which is inaccurate being usable by a reader of the digital data.

8. The method of claim 7, wherein the inaccurate control data encoded onto the data carrier indicates a state; the state including inaccessible, not generally read, and ignored during playing of the digital data.

9. The method of claim 1, further comprising altering data provided on the recordable data carrier, the data including one or more of format data and control data.

10. The method of claim 1, wherein the digital data to be recorded has been downloaded by way of the internet.

11. The method of claim 1, wherein the digital data is one or more of:

audio data, video, images and application files and the data carrier is an optical disc.

12. The method of claim 1, further comprising:

providing digital data required by the end user after encryption of the digital data using a key generated by and stored by the end user, completing a financial transaction between the end user and the supplier of the digital data to license the end user to obtain the digital data, and indicating the completion of the financial transaction whereby the end user is enabled to obtain and decrypt the encrypted digital data utilizing the key stored by the end user.

13. The method of claim 12 wherein the information identifying the licensed rights is obtained by the financial transaction, and is stored at the end user with the encrypted digital data.

14. The method of claim 13, wherein the key enabling recording is caused to expire once the licensed recording of the decrypted digital data has been undertaken.

\* \* \* \* \*